UNITED STATES PATENT OFFICE.

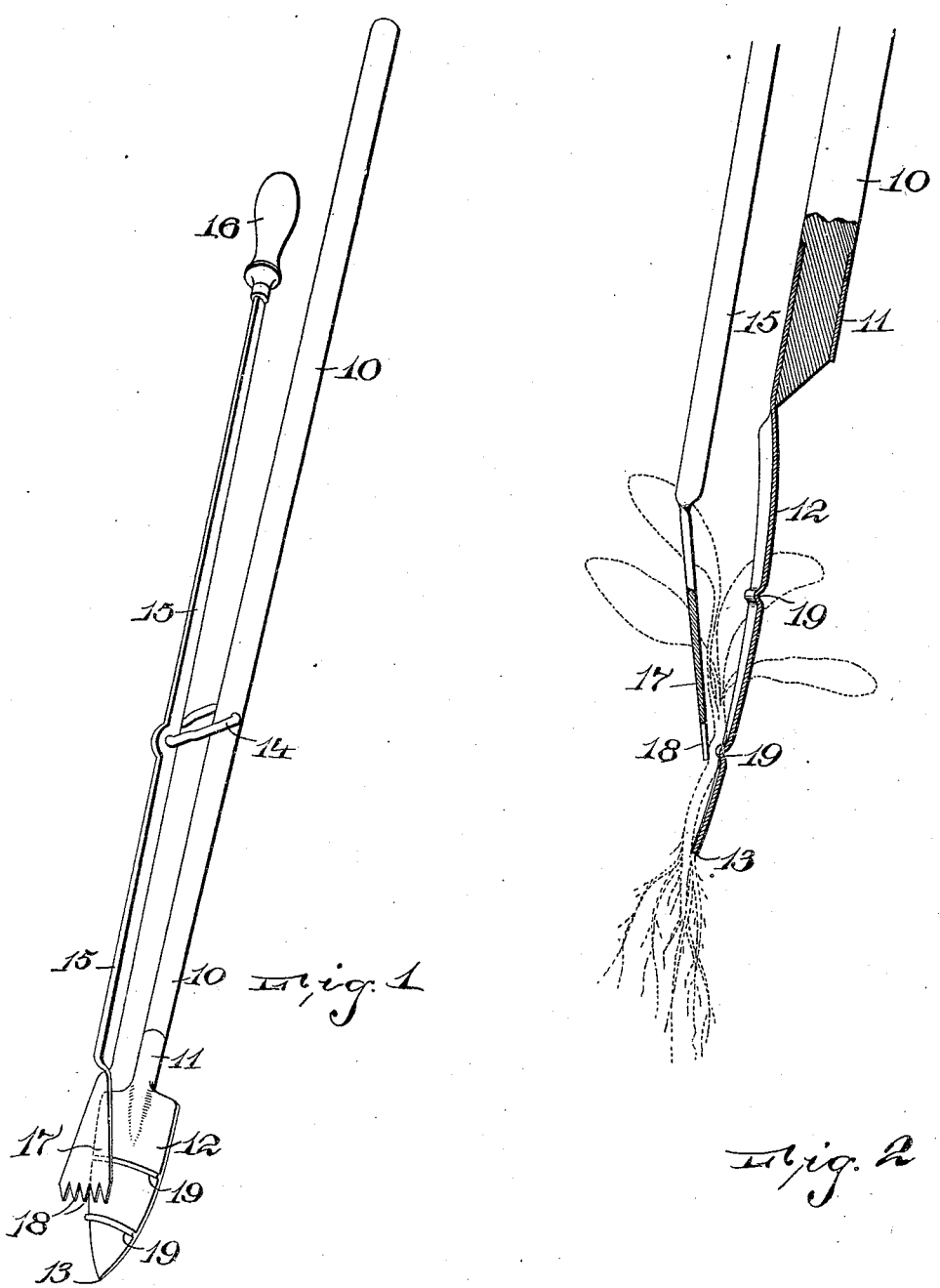

GEORGE GREENE, OF ARLINGTON, NEW JERSEY.

WEEDER.

938,759.  Specification of Letters Patent.  Patented Nov. 2, 1909.

Application filed September 25, 1908. Serial No. 454,714.

*To all whom it may concern:*

Be it known that I, GEORGE GREENE, a citizen of the United States, residing at Arlington, in the county of Hudson and State of New Jersey, have invented certain new and useful Improvements in Weeders; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a weeder, and refers to an implement that is to be forced into the ground, having a pointed spade end and having a handle swiveled or rocking on a support or link that in turn is pivoted to the main handle, the rod forming a pivoted handle having a jaw on its end to engage the spade portion of the device, the spade portion having ribs arranged transversely across its face, each of these ribs being adapted to be engaged by the jaw to make the grip on the weed surer and to permit different penetrations of the spade for different sized weeds, at the same time insuring the gripping.

The invention is illustrated in the accompanying drawing, in which—

Figure 1 is a perspective view of my device, and Fig. 2 is a section of the same, showing the method of grasping a weed when pulling the same.

The device consists of a main handle 10 which may be made of any material, but preferably of wood, and which has, on one end, a ferrule 11 which secures a spade portion 12 to the handle, the spade portion 12 ending in a pointed end 13 for penetration into the soil. This spade portion is slightly bent to stiffen it, and is preferably made of sheet metal so as to make the penetration easy and also make its cost slight. A link 14 is pivotally secured to the main handle 10, and a rod 15 is secured intermediate of its ends and approximately centrally to the link 14, the rod 15 having a handle portion 16, on its upper end, which provides for its manual manipulation, and being broadened out into a jaw 17 on its other end, this jaw being preferably wider on its extremity and having the teeth 18.

When used, the spade portion is driven into the ground alongside a weed and can be turned, if necessary, to loosen the roots, and the jaw 17 is forced down against the weed and holds it in conjunction with the spade portion 12, the operator manipulating the device by the handle 10 and the handle portion 16, and then the weed can be pulled out without much labor.

To insure the grasping of the weed or plant, and at the same time stiffen the spade portion, I provide the spade portion with a series of transverse ribs 19. These ribs can be of any number, but I preferably make two, and these ribs are adapted to prevent the slipping of the tool on a weed, as I find is the usual trouble with weeders as now made. For a small weed the lower rib 19, that is the rib nearest the point, is engaged by the jaw 17, and in case of a deep penetration, the handle portion is pulled upward and the link 14 swings to permit the jaw 17 to be forced in engagement with the upper rib 19. I find a better grip on the plants when using these ribs, and the whole is secure so that there is no unnecessary repetition of grasping on the same plant, when endeavoring to remove it, since the corrugated or ribbed portions of the spade, in conjunction with the jaw, securely hold the stem and roots of the plant and they all come out together as shown in Fig. 2. This weeder, with its link 14 in swinging relation with both the handle and the rod, permits the handle 10 and the rod 15 to be manipulated nearly in parallel relation, and the jaw 17 can be forced into the ground without disturbing the ground very far away from the weed, so that no large hole is the result. Weeders as previously made have the jaw on the fixed pivot, which makes it necessary to make quite an opening due to this action of the jaw, or else the jaw is made so close to the spade portion that they both have to be forced in at once, which makes the labor great.

Having thus described my invention, what I claim is:—

1. A weeder comprising a handle having a spade portion with transverse ribs thereon, a rod, a jaw on one end of the rod to engage the spade portion, and an open link passing through the handle and the rod and in swinging relation with both.

2. A weeder comprising a handle having a spade portion on one end, a rod, a jaw on the end of the rod adapted to engage the spade portion, a handle on the projecting end of the rod for its manual manipulation, a swinging connection between the handle and the rod, and transverse ribs on the spade portion any of the ribs being adapted to be engaged by the jaw.

3. A weeder comprising a handle having a spade portion on one end, the spade portion having transverse ribs and a handle, a rod having a jaw on one end, and a link connecting the handle and the rod at a distance from the spade and the jaw so that the handle and the rod are in swinging and pivotal connection and whereby the jaw is adapted to engage any of the ribs of the spade portion, whereby the jaw can engage the spade for its full length.

In testimony, that I claim the foregoing, I have hereunto set my hand this 23rd day of September 1908.

GEORGE GREENE.

Witnesses:
WM. H. CAMFIELD,
E. A. PELL.